United States Patent [19]

Hotz

[11] 4,112,516
[45] Sep. 5, 1978

[54] PLASTICIZING DEVICE OF AN INJECTION MOLDING MACHINE FOR PLASTICS

[75] Inventor: Alfons Hotz, Näfels, Switzerland

[73] Assignee: Netstal-Maschinen AG, Switzerland

[21] Appl. No.: 723,228

[22] Filed: Sep. 15, 1976

[30] Foreign Application Priority Data

Sep. 17, 1975 [CH] Switzerland .................. 12072/75

[51] Int. Cl.² .................. B29B 1/10; B29B 5/04
[52] U.S. Cl. .................. 366/80; 366/88; 425/209
[58] Field of Search .................. 259/191, 193; 425/208, 425/209, 376

[56] References Cited

U.S. PATENT DOCUMENTS

| | | | |
|---|---|---|---|
| 3,344,215 | 9/1967 | DeWitz et al. | 425/209 X |
| 3,762,692 | 10/1973 | Schippers | 259/191 |
| 3,792,839 | 2/1974 | Gidge | 259/193 |
| 3,936,038 | 2/1976 | Olmsted | 259/191 |
| 3,957,256 | 5/1976 | Murakami | 259/193 |

*Primary Examiner*—Billy S. Taylor
*Attorney, Agent, or Firm*—McGlew and Tuttle

[57] ABSTRACT

A plasticizing device for an injection molding machine for plastics comprises a screw housing having a cylindrical plastic material chamber at one end having a discharge opening. A cylindrical screw is rotatably and axially displaceably mounted in the housing and has a screw head portion adjacent the discharge with an intermediate body portion of reduced diameter adjacent the head portion and a uniform diameter portion on the opposite side of the intermediate portion from the head portion. The uniform diameter portion carries a spiral screw thread which projects radially outwardly from the surface of the screw. A seal ring having an outer periphery engaged with the interior of said screw housing and having an interior diameter greater than and spaced radially outwardly from the intermediate portion of the screw defines a plasticizing material passage with the intermediate portion which connects through a passage defined between a seal washer on the screw which cooperates with the seal ring. In addition a plurality of axially extending and circumferentially spaced passages are defined around the periphery of the screw adjacent the seal washer. These passages may be defined on a separate insert or on a plurality of axially arranged inserts and in this latter case the adjacent inserts are rotated relatively to each other so that the passages are not directly communicated but are offset.

3 Claims, 6 Drawing Figures

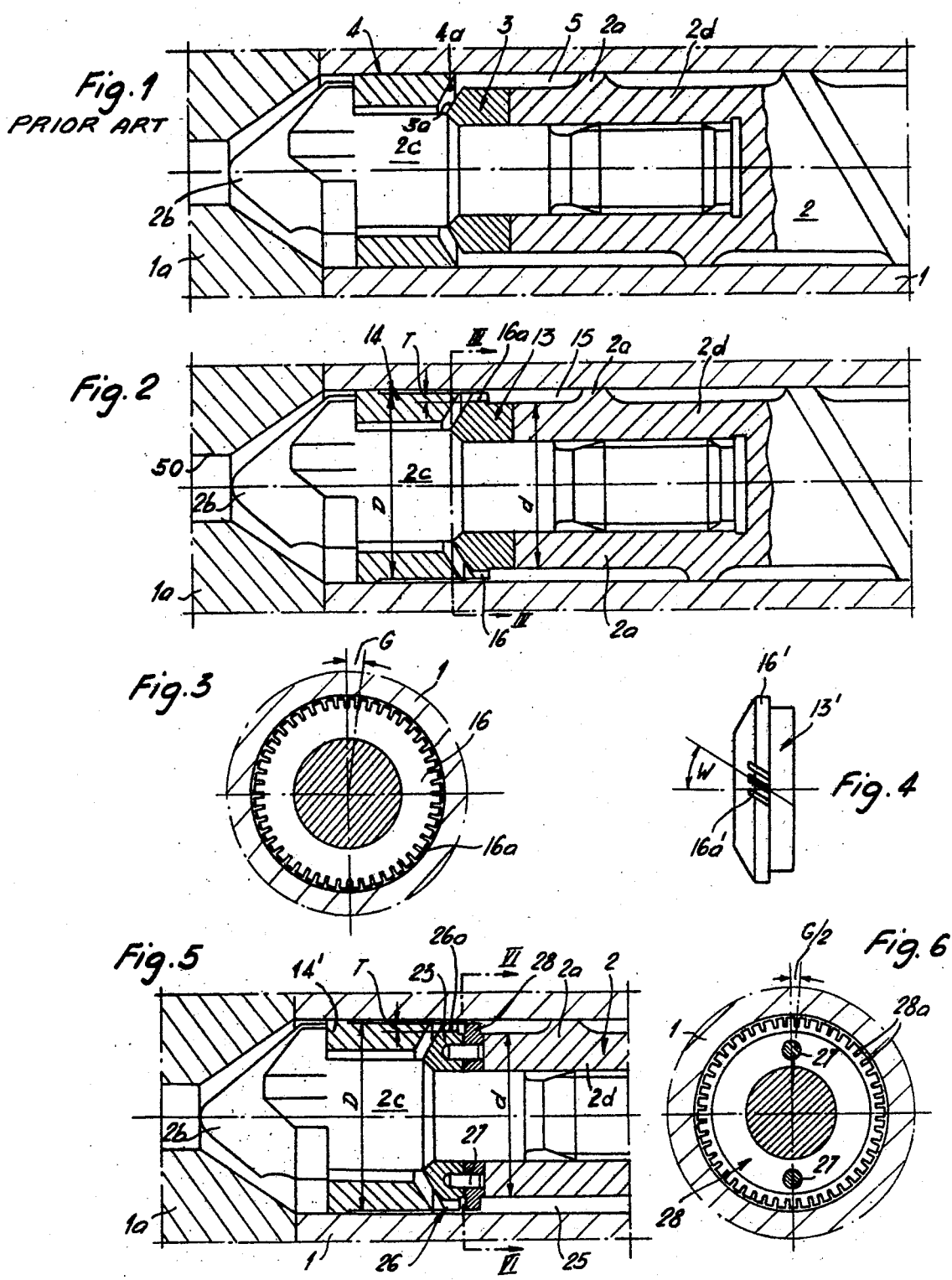

PLASTICIZING DEVICE OF AN INJECTION MOLDING MACHINE FOR PLASTICS

BACKGROUND OF THE INVENTION

1. FIELD OF THE INVENTION

This invention relates in general to the construction of plasticizing devices and in particular to a new and useful plasticizing device for an injection molding machine which includes a plasticizing screw having a plurality of axially extending and circumferentially spaced passages around its periphery adjacent the cylindrical housing discharge thereof.

2. DESCRIPTION OF THE PRIOR ART

The present invention relates in particular to a plasticizing device of an injection molding machine for plastics including an axially displaceable plasticating screw and a check valve, comprising a seat body positioned in the plasticating cylinder as well as a seal ring which axially cooperates therewith and is fixed to the screw.

In known plasticating devices of this kind, granulated plastic material is fed into the plasticating cylinder and it is plasticized in the zone of the screw thread of the rotating screw, while the homogenization, i.e. the intimate mixing and the plastication of the perhaps not yet completely plasticized particles of the granulate takes place in the zone of the discharge end portion of the screw in a discharge or metering zone.

With small quantities of plastic fed through or discharged, the period of dwell of the plastic in the discharge or metering zone of the plasticating screw is sufficiently long to permit transferring to the plastic of enough thermal energy, by heat input from the outside as well as by the produced frictional heat, necessary for a completely satisfactory homogenization. In addition, the optimum homogeneity of the plasticated plastic can be controlled by varying the back pressure directed against the screw.

With large quantities of plastic fed through or discharged, however, such as are needed, for example, for the manufacture of thin-walled packaging parts, and if usual screws are used having a small length-to-diameter ratio, the limit of a completely satisfactory homogenization and intimate mixing of the plastic, for example, with dry or wet coloring substances, is reached very soon, i.e. non-melted particles of the granulate and an irregular distribution of the colorant occur in the molded packaging part.

Up to date, these drawbacks could be avoided only by using special screws having a larger length-to-diameter ratio. Known are already so-called static mixing systems which are mounted on the plasticating cylinder at the end of the discharge or metering zone of the plasticating device, thus forming a connecting member between the plasticating device and the tool. Such systems, however, do not provide a nozzle closure so that, in order to avoid a leakage of material disturbing the cycle, it becomes necessary to provide the metering and the relieving of the plastic melt in the plasticating unit in a period of time prior to the tool opening. Further known are co-rotating mixing elements which, instead of the screw threads, comprise cam-like extensions of various kind the shearing effect of which produces heat in the plastic melt. These devices involve a strong increase in the needed torque or drive power. For extreme performances in plastication, these devices do not prevent the escape of non-plasticized particles of material either. In addition, these mixing systems are very expensive.

SUMMARY OF THE INVENTION

To eliminate these drawbacks and, in particular, the disadvantage of a limited use of the usual universal screw, i.e. to be able to use such screws also in the manufacture of thin-walled packaging parts, thus for the discharge of large quantities of plastic, it is provided, in accordance with the invention, that the discharge end portion of the screw comprises an annular section having a plurality of flow passages which are separated from one another in the circumferential direction, and preferably that the seal ring of the check valve for the device be associated with at least one circular row of circumferentially spaced flow passages.

Thus, the annular space between the circumference of the seal ring and the plasticating cylinder is subdivided into a plurality of relatively narrow passages which provide for a corresponding distribution of the plastic mass fed thereto in the form of a continuous ring, whereby the mass is thoroughly mixed and homogenized. In particular, by appropriately dimensioning the cross-sectional areas of the small passages, a filtering effect is also obtained. That is, non-plasticated particles are prevented from passing therethrough and into the mold.

Extensive injection-molding tests have proved that due to the inventive circular row of passages, the above mentioned drawbacks of the universal screw can be completely eliminated, without reducing the capacity for plastication as compared to the conventional construction with a simple seal ring, and without thermally damaging the treated plastic. It is further to be noted that in all of the injection-molding tests carried out with a universal screw, no deviations from the metering times have been observed and that the operation pressure of the hydraulic motor has increased only insignificantly.

In one embodiment of the invention there are two axially spaced inserts which are circumferentially offset relative to each other so that their circumferentially spaced rows of passages which are offset has proved particularly advantageous. At least one circular row of passages may be provided in a body which is integral with the seal ring. Although the passages may be embodied also by bores, it is advantageous to give them the form of gaps of a toothed gear, i.e. of radial slots which may, analogously to a straight or angular toothing of a gear, extend in a direction parallel to the screw axis or obliquely thereto. Slots extending in intersecting directions may also be used.

Accordingly it is an object of the invention to provide an improved plasticizing device which includes a cylindrical plasticizing screw running in a cylindrical housing and which includes an intermediate portion of lesser diameter than the remaining portion which accommodates a seal ring in the housing and which has a seal washer with an end face opposed to the seal ring and which cooperates therewith and wherein the screw or seal ring or an extension of either or a separate insert is provided which defines a plurality of circumferentially spaced passages which extend into the passage between the seal ring and seal washer and which may be defined as inserts or slots formed radially inwardly from the screw or a separate insert or as internal passages within the screw body.

A further object of the invention is to provide a plasticizing device which is simple in design, rugged in construction and economical to manufacture.

BRIEF DESCRIPTION OF THE DRAWINGS

In the Drawings:

FIG. 1 is an axial sectional view of a plasticizing device constructed in accordance with the prior art;

FIG. 2 is a view similar to FIG. 1 but showing a first embodiment of the invention;

FIG. 3 is a section taken along the line III—III of FIG. 2;

FIG. 4 is a side elevational view of another embodiment of seal and mixing ring;

FIG. 5 is an axial sectional view similar to FIG. 2 of a second embodiment of the invention; and FIG. 6 is a section taken along the line VI—VI of FIG. 5.

DETAILED DESCRIPTION OF PREFERRED EMBODIMENTS

As indicated in FIG. 1, there is a plasticizing cylinder of an injection molding machine for plastics which comprises a nozzle plate 1a on the discharge end of the cylindrical housing 1. In the cylindrical housing 1 there is a screw generally designated 2 which is of cylindrical form and includes a head portion 2b, an intermediate portion of smaller diameter 2c and a remaining cylindrical body portion 2d having a spirally extending screw 2a which projects radially outwardly from the surface thereof. A seal ring or seal washer 3 is disposed around the screw 2 adjacent the reduced diameter portion 2c and it includes a conical end face 3a which cooperates with a similar conical end face 4a of a ring 4 which is received in the cylinder 1 and is movable therein with a small play. A continuous annular passage space 5 is formed between the periphery of the screw body portion 2d and the interior surface of the cylindrical housing 1 through which the plasticized injection mass is fed. This smooth passage space has a constant cross section so that any mixing or homogenizing effect on the plastic material particularly with large mass volume passing therethrough is relatively small and the risk of a non-melted plastic particle passing therethrough to the mold is great.

Referring to the drawings in particular, the invention embodied therein as shown in FIGS. 2 and 3 comprises a nozzle plate 1a having a discharge 50 and with a plasticizing screw 2 rotatable and actually displaceable therein similar to the prior art showing. In accordance with the invention a seal ring or seal washer 13 is provided which cooperates with a seal ring 14 of a check valve system and in the embodiment shown it is made integral with the screw and is provided with a collar portion 16 having an outer diameter D which is substantially equal to the inside diameter of the cylinder 1 so that it is increased over a diameter corresponding to the screw body portion 2d as represented by d. In the collar 16 there are a circular row of radial rim notches 16a which extend at least approximately to the level of the shank diameter d to rim notches 16a which extend axially through collar 16 and are relatively narrowly spaced from each other by an angle G may extend in axial planes similar to a straight toothing of a gear or at an angle W as indicated in FIG. 4 to the axial plane. In FIG. 4 the notches 16a' are formed on a separate insert 13' in which the collar 16' is included. In any case the teeth separating the rim notches 16a interrupts the cross-sectional area of the annular passage space 15 forming the homogenization zone at a great number of locations and this results in a very satisfactory mixing and homogenization of the mass which passes through and prevents a passage of the unplasticized plastic particles without causing an undesirable high increase in the operational pressure of the motor driving the screw and this has been proved by many tests.

While in the embodiment described the seal ring 13 is made in one piece with the rim notch collar 16 and provided with a single circular row of passages in the embodiments of FIGS. 5 and 6 two circular rows of passages are provided which are positioned axially one after the other at a small spacing. In this design the row of passages 26a which are defined in a collar portion of a seal insert 23 are located at the nozzle side similar to the arrangement of FIG. 2 and this element forms a conical sealing surface of the check valve with the seal ring 14'. A second row of passages 28a is provided in the circumference of an insert ring 28 which is secured to the seal insert 23 by means of pins 27. The width, depth and pitch G of these rim notches 28a correspond to the respective values of the notches 26a. The insert ring 28 is angularly offset by G/2 relative to the seal insert 23 and this results in a particularly effective intermixing of an homogenization of the mass which passes therethrough. It is of course possible to provide much more additional insert rings 28 but care must be taken not to exceed the overall axial length of a normal seal ring 3 as indicated in FIG. 1, in order to be able to selectively use such a normal seal ring which is flush with the end portion of the screw or one or more rings 13 and 23 or 28 which are provided with circular rows or passages.

In the above-described embodiments the passages are embodied as rim notches of a collar. It is possible however to design the passages as bores or holes which extend parallel to the axis of the screw or obliquely thereto and are provided in a collar projecting from the shank of the screw.

While specific embodiments of the invention have been shown and described in detail to illustrate the application of the principles of the invention, it will be understood that the invention may be embodied otherwise without departing from such principles.

What is claimed is:

1. A plasticizing device for an injection molding machine for plastic material comprising a screw housing having a cylindrical plasticizing material chamber and an end of said chamber having a discharge opening, a cylindrical screw rotatably and axially displaceably mounted in said housing and having a screw head portion adjacent the discharge opening, a uniform diameter portion with a radially extending spiral screw and an intermediate body portion located between said head portion and said uniform diameter portion, a seal ring of an outer diameter substantially the same as the interior diameter of said chamber disposed in said chamber and having an inner diameter greater than and spaced radially outwardly from said intermediate portion of said screw to define a plasticizing material passage therebetween, a seal washer on said screw in the vicinity of the junction between said intermediate body portion and said uniform diameter portion having a sealing face cooperatively opposed to a sealing face of said seal ring, means defining a plurality of axially extending and circumferentially spaced passages around the periphery of said screw adjacent said seal washer in at least two spaced apart rows which are disposed in axial relationship, and a separate insert ring mounted on said screw between said seal washer and said screw, wherein said rows are offset from each other and the passages extend radially inwardly substantially to the diameter of said uniform diameter portion, one of said rows being disposed around said seal washer, the other of said rows being disposed around said insert ring and defining a space between said two rows, wherein said passages intersect at acute angles to each other.

2. A plasticizing device according to claim 1, wherein said means defining a plurality of axially extending passages of said one row on said seal washer comprises a collar portion on said seal washer of greater exterior dimension than said uniform diameter portion having notches therein defining said passages.

3. A plasticizing device according to claim 1, wherein said passages extend at an acute angle relative to the axis of said screw.

* * * * *